(12) United States Patent
Silber et al.

(10) Patent No.: US 11,084,518 B2
(45) Date of Patent: Aug. 10, 2021

(54) SECURING DEVICE FOR A SHAFT ARRANGEMENT AND METHOD FOR TEMPORARILY LIMITING THE FREEDOM OF MOVEMENT OF A UNIVERSAL JOINT

(71) Applicants: THYSSENKRUPP PRESTA AG, Eschen (LI); thyssenkrupp AG, Essen (DE)

(72) Inventors: Michael Silber, Stuttgart (DE); Elvira Veladzic, Haag (CH); Tobias Köb, Hörbranz (AT); Felipe Segatto, Shanghai (CN)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 703 days.

(21) Appl. No.: 15/751,814

(22) PCT Filed: Jul. 18, 2016

(86) PCT No.: PCT/EP2016/067067
§ 371 (c)(1),
(2) Date: Feb. 9, 2018

(87) PCT Pub. No.: WO2017/025279
PCT Pub. Date: Feb. 16, 2017

(65) Prior Publication Data
US 2018/0237053 A1    Aug. 23, 2018

(30) Foreign Application Priority Data
Aug. 11, 2015   (DE) ..................... 10 2015 215 290.1

(51) Int. Cl.
*F16D 3/38*   (2006.01)
*B62D 1/184*   (2006.01)
(Continued)

(52) U.S. Cl.
CPC ............... *B62D 1/184* (2013.01); *B62D 1/16* (2013.01); *F16B 21/125* (2013.01); *F16D 3/40* (2013.01);
(Continued)

(58) Field of Classification Search
CPC . F16D 3/38; F16D 3/382; F16D 3/387; F16D 3/40; F16D 3/405; B62D 1/16;
(Continued)

(56) References Cited

U.S. PATENT DOCUMENTS 2,208,547 A * 7/1940 Murphy .................... F16D 3/38
464/150
3,783,638 A * 1/1974 Doran ....................... F16D 3/40
464/130

(Continued)

FOREIGN PATENT DOCUMENTS

| CN | 101586630 A | 11/2009 |
| CN | 102292563 A | 12/2011 |

(Continued)

OTHER PUBLICATIONS

English Translation of International Search Report issued in PCT/EP2016/067067, dated Sep. 16, 2016 (dated Sep. 26, 2016).

*Primary Examiner* — Michael P Ferguson
(74) *Attorney, Agent, or Firm* — thyssenkrupp North America, LLC (57) ABSTRACT

A securing device for temporarily limiting movement of a universal joint of a steering column may include a locking element that extends in a longitudinal direction and has a free front end at a front as seen in the longitudinal direction. A handling means may be fitted at a rear of the locking element as seen in the longitudinal direction. The locking element may have a blocking body, and first and second positioning elements that are disposed on opposite sides of (Continued)

the blocking body and extend in the longitudinal direction adjacent to the blocking body. The positioning elements may be resilient relative to the blocking body in a transverse direction that is transverse to the longitudinal direction. The positioning elements help simplify installation and improve protection against damage.

20 Claims, 3 Drawing Sheets (51) Int. Cl.
*F16D 3/40* (2006.01)
*B62D 1/16* (2006.01)
*F16B 21/12* (2006.01)

(52) U.S. Cl.
CPC ..... *F16D 2300/12* (2013.01); *Y10T 403/1608* (2015.01); *Y10T 403/32557* (2015.01)

(58) Field of Classification Search
CPC ....... Y10T 403/1608; Y10T 403/32041; Y10T 403/32557; Y10T 403/587; F16B 21/125; F16B 2021/14
See application file for complete search history.

(56) References Cited

U.S. PATENT DOCUMENTS

| | | | | |
|---|---|---|---|---|
| 4,570,319 | A * | 2/1986 | Skoworodko | F16D 3/405 29/259 |
| 5,295,408 | A * | 3/1994 | Nagle | F16C 1/105 74/501.5 R |
| 5,564,313 | A | 10/1996 | Hoblingre | |
| 5,597,566 | A | 1/1997 | Huls | |
| 6,869,110 | B2 * | 3/2005 | Okada | F16L 37/144 285/319 |
| 7,014,220 | B2 * | 3/2006 | Szabo | F16L 37/144 285/305 |
| 7,574,940 | B2 * | 8/2009 | Ridgway | B62D 1/16 180/287 |
| 9,039,041 | B2 * | 5/2015 | Buzzard | B62D 1/16 280/771 |
| 10,156,865 | B2 * | 12/2018 | Buzzard | B62D 1/16 |
| 2013/0017892 | A1 | 1/2013 | Moriyama | |
| 2014/0086679 | A1 | 3/2014 | Galehr | |

FOREIGN PATENT DOCUMENTS

| | | |
|---|---|---|
| CN | 103562581 A | 2/2014 |
| CN | 103963821 A | 8/2014 |
| DE | 102008041153 A | 2/2010 |
| EP | 0 655 381 B | 5/1995 |
| EP | 0727341 A | 8/1996 |

* cited by examiner

SECURING DEVICE FOR A SHAFT ARRANGEMENT AND METHOD FOR TEMPORARILY LIMITING THE FREEDOM OF MOVEMENT OF A UNIVERSAL JOINT

CROSS REFERENCE TO RELATED APPLICATIONS

This application is a U.S. National Stage Entry of International Patent Application Serial Number PCT/EP2016/067067, filed Jul. 18, 2016, which claims priority to German Patent Application No. DE 10 2015 215 290.1, filed Aug. 11, 2015, the entire contents of both of which are incorporated herein by reference.

FIELD

The present disclosure generally relates to securing devices and universal joints, including a securing device that temporarily limits freedom of movement of a universal joint of a shaft arrangement in a steering column.

BACKGROUND

In steering systems of motor vehicles, the steering torque introduced into the steering wheel is channeled into the steering mechanism via the steering shaft. The steering shaft is designed in the form of a jointed shaft, in order to compensate for the angular offset, and usually has an intermediate steering shaft, which is connected to the steering-wheel-side steering spindle, and to the input shaft of the steering mechanism, via a respective universal joint. Such an arrangement is known, for example, from DE 10 2008 041 153 A1.

Universal joints, also referred to as cardan joints, allow shaft parts which are connected to one another in an articulated manner to be pivoted in relation to one another about two mutually perpendicular joint axes of the joint pins of a cardan spider, the crossing-over joint axes running in the plane of the cardan spider. The two joint pins located along the first joint axis are mounted in the pair of arms, located opposite one another, of a first joint fork, which is connected to the one shaft part, such that they can be rotated about the first joint axis. Correspondingly, the second joint pins are mounted in the pair of arms, likewise located opposite one another, of a second joint fork, which is connected to the second shaft part, such that they can be rotated about the second joint axis.

The free movement capability of the shaft parts over a predetermined angle range is necessary for torque transmission. However, when the steering column is being installed in a motor vehicle, it may be the case that the shaft parts are angled in relation to a joint axis to a more pronounced extent than in the installed position, for example are located at right angles or at an acute angle in relation to one another, and at the same time are rotated in relation to one another about the other joint axis. As a result, the joint forks can strike against one another and be damaged. If, in a disadvantageous angled position, a torque is applied, it is also the case that the bearing means of the joint pins can be damaged.

In order to avoid damage as a result of disadvantageous relative movements of the shaft parts during transportation, for example EP 0 727 341 A1 discloses a securing device which can block the movement of a universal joint. The known securing device has an elongate locking element which has a handling means at its rear end and a blocking body, which extends in the longitudinal direction toward the front, free end and can be inserted between the inner side of an arm of the first joint fork and a joint pin which is mounted in the second joint fork. The releasable fixing takes place by means of a resilient positioning element which is adjacent to the blocking body, as seen in the transverse direction, and retains the locking element in position by latching-in action.

However, the known securing device provides exclusively for the blocking of all the degrees of freedom of the universal joint, to be precise merely when the shaft parts are located essentially at right angles to one another. On the one hand, this means that it is basically not possible to move or angle the intermediate steering shaft in the universal joint relative to the steering spindle, as is usually necessary for installation in a motor vehicle. This renders the assembly of the motor vehicle more difficult. On the other hand, it is not possible for the entire installation process to take place in the angled position, and therefore the securing device has to be removed before or during installation, as a result of which it is possible for the aforementioned disadvantageous angled positions to arise and therefore for damage to be caused.

Thus a need exists for an improved securing device, in particular for a steering shaft of a motor vehicle, which provides for simplified installation and gives improved protection against damage.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art The present disclosure generally relates to securing devices for temporarily limiting freedom of movement of universal joints of shaft arrangements of steering columns. In some examples, a securing device may include a locking element, which extends in a longitudinal direction and has a free front end at a front, as seen in the longitudinal direction, and on which a handling means is arranged at a rear, as seen in the longitudinal direction, wherein the locking element has a blocking body and at least one positioning element, which extends in the longitudinal direction adjacent to the blocking body and is designed to be resilient relative to the blocking body in a transverse direction transverse to the longitudinal direction. The present disclosure also generally relates to methods for temporarily limiting the freedom of movement of universal joints.

In some examples, the locking element may have in each case one positioning element on either side of the blocking body, as seen in the transverse direction.

In the case of the invention, the blocking body has in each case one positioning element on two opposite outer sides. It is thus possible for the blocking body to be accommodated in a universal joint in a state in which it is mounted elastically between the resilient positioning elements, as seen in the transverse direction. For this purpose, the locking element is inserted, with the free end in front, between the opposite arms of one of the two joint forks, wherein the outer sides of the positioning elements are directed toward the joint forks from the inside. The dimensions of the locking element are selected such that the two positioning elements have their outer sides, which are directed away from the blocking body, lying against the inner sides of the opposite arms of the joint fork, said inner sides being directed toward one another. Since the positioning elements are of resilient design, the spring force acts as a restoring force on the blocking body when the locking element is displaced in the direction toward one of the two fork arms, the blocking body thus being oriented, and positioned, centrally between the fork arms. This method of elastic self-centering makes it possible for the blocking body to be fitted, and mounted, in a releasable manner and in a defined position within the universal joint, so that the freedom of movement of the universal joint is thus restricted in a defined manner by the blocking body.

The blocking body performs the blocking action by limiting the convergence of surfaces of the two joint forks which are moved toward one another during pivoting about one of the joint axes. The blocking body here serves as a stop which is supported, by way of a first supporting surface, on a moveable surface of the one joint fork and, by way of a second supporting surface, on a surface which is located on the other joint fork and is fixed relative to the moveable surface. For this purpose, provision may be made according to the invention for the blocking body to have a first supporting surface, with a surface normal which runs in the height direction perpendicular to the longitudinal and transverse directions, and a second supporting surface, with a surface normal which runs counter to the height direction perpendicular to the longitudinal and transverse directions. The first and second supporting surfaces are thus formed by the opposite surfaces of the blocking body with surface normals which are directed respectively in and counter to the height direction, i.e. perpendicularly to the longitudinal and transverse directions in each case.

If the first supporting surface is defined as being formed by the upper side, and the second supporting surface is defined as being formed by the underside, of the blocking body, the two surfaces on which the positioning elements are located and which have surface normals in the transverse direction may be regarded as being side surfaces. Correspondingly, the front, free end of the blocking body is delimited in the longitudinal direction by the front end surface, of which the surface normal is oriented to the front, as seen in the longitudinal direction.

Blocking of the universal joint in just one degree of freedom of movement can be achieved by the locking element being inserted between the base of the first joint fork, the first fork arms extending from said base, and the cardan spider, and therefore the blocking body lies against the fork base by way of the one supporting surface on its underside. Said first fork arms bear the first joint pins of the cardan spider such that they can be rotated about the first joint axis, which consequently runs in the transverse direction of the inserted blocking element. If an attempt is then made to pivot the universal joint about said first joint axis, one of the second arms of the second joint fork inevitably advances toward the base of the first joint fork, and thus also toward the supporting surface on the upper side of the blocking body. If the blocking-body thickness, which corresponds to the distance between the two opposite supporting surfaces, is dimensioned so as to correspond to the shortest distance between the base of the first joint fork and the arms of the second joint fork in the rectilinear, i.e. non-pivoted, state of the universal joint, the second joint fork is supported on the upper side of the blocking element so that pivoting about the first joint axis is prevented, the blocking element, for its part, supporting the initiated force on the base of the first joint fork via its underside. The movement of the universal joint about the first joint axis is thus blocked. In contrast, during rotation of the second joint fork about the second joint axis, the fork arms maintain the same distance from the base of the first joint fork, in which case the blocking body is not subjected to any force and pivoting about the second joint axis remains possible.

In order for the pivoting of the joint fork to be reliably restricted, it is possible to select the length of the blocking body to be greater than the distance between the fork arms. This ensures that the fork arms can be reliably supported on the blocking body.

It is an advantage of the embodiment according to the invention that the blocking body is automatically centered between the fork arms, in an optimum position in the universal joint, by the positioning element following insertion, and it is therefore possible to achieve defined blocking of an individual degree of freedom of movement. This renders installation easier than in the case of rigid blocking of the entire joint. Moreover, the locking element reliably prevents the joint forks from striking against one another, and being damaged in the process, as a result of disadvantageous angled positions. This is because, while rotation about the second joint axis is still possible, the rotation is limited by the second fork arms striking laterally against the upper side of the blocking element at the latest as they pivot through 90°, it therefore likewise being the case that they cannot come into direct contact with the first joint fork.

It is advantageous if the locking element is designed to be mirror-symmetrical in relation to a mirror plane which intersects the blocking body in a longitudinal direction, and runs in a height direction perpendicular to the transverse direction, and/or to be mirror-symmetrical in relation to a second mirror plane, which intersects the blocking body in the longitudinal direction and runs in the transverse direction. The mirror-symmetrical configuration in relation to a mirror plane, preferably two mirror planes which are located perpendicularly to one another and intersect the locking element in the longitudinal direction, can ensure that inadvertent, incorrect insertion of the securing device is ruled out in practice and the automatic centering of the locking element according to the invention between the fork arms is guaranteed.

The blocking body is preferably of cuboidal design with a predetermined length in the longitudinal direction, a predetermined width in the transverse direction and a predetermined thickness in the height direction. The length should be greater than, or equal to, the distance between the fork arms of the universal joint which is to be blocked, it therefore being possible to limit the pivoting about the two joint axes. The width is selected so as to allow insertion of the blocking body, with the positioning elements on either side, between the fork arms. The thickness is smaller than, or equal to, the free distance between the base of the one joint fork and the cardan spider or the arms of the other joint fork.

In the case of the conventional designs of universal joints, it is usually expedient for the width of the blocking body to be greater than the thickness thereof.

An advantageous embodiment of the invention provides for the locking element to have a main body, from which the blocking body and the positioning elements extend in the direction of the free end. It is possible for the main body to be designed in the form of part of the blocking body or to merge into the same. A handling means may be fitted at the rear of the main body. The main body can serve to position the positioning elements relative to the blocking body. For example, the positioning elements may be designed in the form of leaf springs which are retained on one side, by way of their rear end, on the main body and extend forward, as seen in the longitudinal direction, essentially parallel to the blocking body and each at a distance therefrom. The positioning elements thus have their free leaf-spring ends directed toward the free end of the positioning element or blocking body. The free ends of the positioning elements can be bent resiliently, as seen in the transverse direction in relation to the blocking body, toward the side surfaces of the blocking body. As a result of the positioning elements being pushed together elastically toward the blocking body, the width of the locking element is reduced by the distance, and insertion of the locking element is thus facilitated. The positioning elements designed in this way ensure reliable positioning. Such leaf springs, moreover, can be produced, and secured on the main body, with low outlay.

An advantageous embodiment provides for the securing device to be designed in the form of a single-piece plastic part, preferably in the form of a plastic injection molding part. Plastics can have their material properties, such as hardness, strength, elasticity and the like, optimally adapted to the expected requirements, for example they may be softer than the material of the joint components, in order to avoid damage, and at the same time be strong enough not to be crushed, or broken, during blocking operation. The elasticity of the plastic material allows the positioning elements according to the invention to be integrated in one piece in a straightforward and functionally reliable manner. Furthermore, injection-molding production can be achieved particularly cost-effectively.

It is preferred if at least one of the positioning elements has at least one latching element formed on or in its outer side, which is directed away from the blocking body. A latching element may be realized, for example, by a latching protrusion or protuberance formed on the outside of the positioning element. During insertion, the spring action of the positioning elements allows a positioning element to be moved elastically relative to the blocking element and to snap in, or latch in, behind an edge or in a depression of a joint fork. This can give rise to reliable and nevertheless easily releasable fixing of the securing device in a universal joint. If appropriate, the latching elements may also comprise depressions, which can interact with protrusions of a joint fork.

A development provides for two latching elements to be spaced apart from one another in the longitudinal direction. The latching elements may be designed, for example, as formed-on structures or protrusions, the distance between which corresponds to the width of a joint fork. It is thus possible for the positioning elements to accommodate a joint fork between them in a positionally precise manner in the longitudinal direction, or to latch into said joint fork, this ensuring specific positioning of the securing device in the universal joint.

It is also advantageous if, in the direction of the free end, at least one positioning element is designed to be beveled toward the blocking body, as seen in relation to the longitudinal direction. The ends of the positioning elements can thus taper in an arrow-shaped manner in the longitudinal direction toward the free end of the locking element. The introduction slope formed in this way facilitates the insertion between the arms of a joint fork. It is likewise possible for the positioning elements to be beveled or rounded toward the outside, as seen in the transverse direction, in order to facilitate insertion and removal.

The handling means may have a gripping piece. The gripping piece may be designed, for example, in the form of a gripping ring or knob, which may be connected to the blocking body, or the main body of the locking element, directly or via a stem. The gripping piece can be of ergonomically advantageous configuration, in order to provide for straightforward and reliable manual, or even automated, insertion and removal of the securing device. The gripping piece may be formed in one piece with the locking element, for example in the form of a plastic injection molding.

According to the invention, the movement capability can be defined by a method for temporarily limiting the freedom of movement of a universal joint by the insertion of a securing device, wherein the universal joint comprises:

a first joint fork, having two first fork arms which extend from a first fork base, are located radially opposite one another and have radially opposite first bearing means, a second joint fork, having two second fork arms which extend toward the first joint fork from a second fork base, are located radially opposite one another and have radially opposite second bearing means, a cardan spider having joint pins arranged in a cross-form manner, wherein two first joint pins are mounted in the first bearing means of the first joint forks such that they can be rotated about a first joint axis, and two second joint pins are mounted in the second bearing means of the second joint fork such that they can be rotated about a second joint axis, and wherein the securing device has a locking element with a blocking body, which is inserted in a releasable manner, in a direction transverse to the axial direction (longitudinal direction) of the first joint fork, between the arms of the first joint forks, and between the base of the first joint fork and the cardan spider such that, during rotation about the first joint axis, at least one of the second fork arms is supported against the blocking body and the blocking body is supported against the first fork base.

The method limits or blocks the pivoting of the second joint fork relative to the first joint fork in respect of rotation about the first joint axis, whereas pivoting about the second joint axis is still possible. A securing device according to the invention makes it possible to implement the method in a particularly user-friendly and reliable manner. For this purpose, prior to transportation, a securing device is inserted, for installation purposes, into a universal joint and fixed, which, by virtue of the positioning elements, can be achieved with low outlay and a high degree of reliability.

Figure 1:
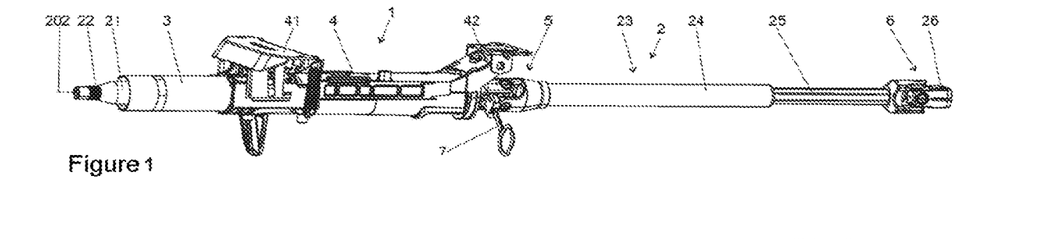
FIG. 1 is a perspective view of an example steering column.

FIG. 1 shows a steering column 1, which comprises a steering shaft 2. The steering shaft 2 has a steering spindle 21, a fastening portion 22 on which to fit a steering wheel (not illustrated here) of a motor vehicle being formed at the rear end of said steering spindle, as seen in relation to the direction of travel. The steering spindle 21 is mounted in a lateral-surface unit 3 such that it can be rotated about its longitudinal axis. The lateral-surface unit 3 is retained in a carrying unit 4, which has fastening means 41, 42 for fastening the steering column 1 on a vehicle body (not illustrated).

The front end of the steering spindle 21, as seen in relation to the direction of travel, projects out of the lateral-surface unit 3 at the front and is connected to an intermediate shaft 23 in an articulated manner via a universal joint 5, also referred to as a cardan joint. The intermediate shaft 23 has a tubular outer shaft 24, in which an inner shaft 25 is mounted in a longitudinally telescopic manner with torque locking. At the front end of the intermediate shaft 23, the inner shaft 25 has arranged on it a further universal joint 6, which connects the intermediate shaft 23 to a steering mechanism (not illustrated here) in an articulated manner by way of a coupling piece 26 for torque-locking connection.

Figure 3:
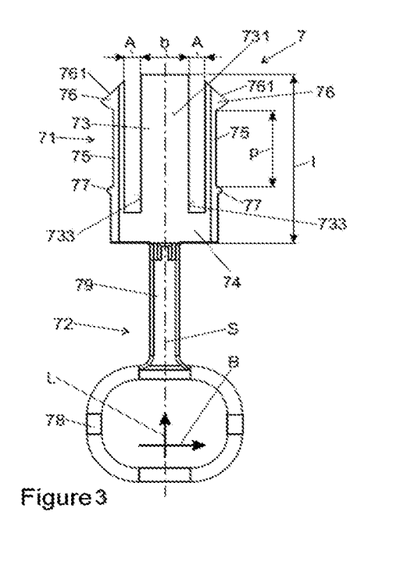
FIG. 3 is a plan view of the example securing device of FIG. 2.
Figure 4:
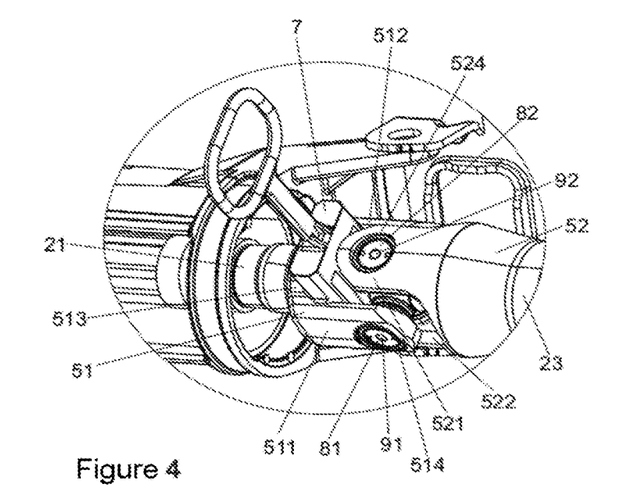
FIG. 4 is a detail view of an example universal joint of the steering column of FIG. 1.

A securing device 7 according to the invention, which is illustrated separately in FIGS. 3 and 4, is inserted into the universal joint 5 for the purpose of temporarily limiting the movement capability of the intermediate shaft 23 relative to the steering spindle 21.

Figure 2:
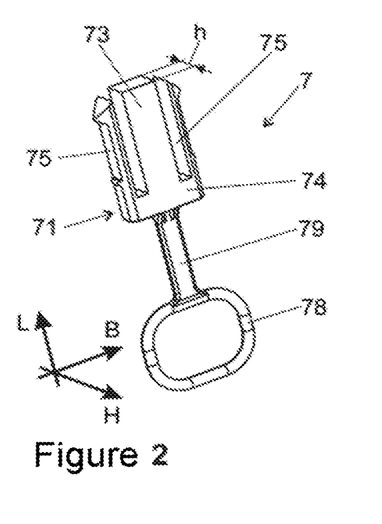
FIG. 2 is a perspective view of an example securing device.

The securing device 7 has a locking element 71 which extends in a longitudinal direction L and has a handling means 72 fitted at its rear end.

The locking element 71 has a blocking body 73, which extends forward in one piece from a main body 74. The blocking body 73 has a cuboidal basic shape, with a first supporting surface 731 which is formed by the upper side, directed toward the person viewing FIG. 3, and of which the surface normal is oriented out of the plane of the drawing, in a height direction H perpendicular to the longitudinal direction L and transverse direction B. The side which is directed away from the person viewing FIG. 3 has formed on it a second supporting surface 732, which is located opposite the first supporting surface 731 and of which the surface normal is oriented counter to the height direction H. The distance between the parallel supporting surfaces 731 and 732 corresponds to the thickness h of the blocking body 73. The blocking body 73 has a width b in the transverse direction B; the blocking body 73, together with the main body 74, has an overall length l in the longitudinal direction L.

Two positioning elements 75 are fitted, by way of their rear ends, on the front of the main body 74 and extend forward, as seen in the longitudinal direction L, essentially parallel to the side surfaces 733 and 734 of the blocking body 73, to be precise at a distance A therefrom as measured in the transverse direction B, i.e. perpendicularly to the longitudinal direction L.

The positioning elements 75 are formed preferably in one piece with the main body 74, as plastic injection moldings. On account of the elasticity of the plastic, the positioning elements 75 form leaf springs, which have their rear ends secured on the main body 74 and of which the front ends can be moved resiliently, in the transverse direction, toward the blocking body 73 by the distance A.

In the region of their front ends, the positioning elements 75 have first latching elements 76 in the manner of protrusions or protuberances formed externally, i.e. on their outer sides which are directed away from the blocking body 73. The latching elements 76 project outward from the positioning elements 75 and have introduction slopes 761, which run obliquely in the forward direction toward the blocking body 73. The two introduction slopes 761 of the two positioning elements 75 thus form an arrangement which tapers in an arrow-shaped manner to the front.

The latching elements 76 project outward from the positioning elements 75 preferably not more than by the amount equal to the distance A. It is thus possible for the positioning elements 75, for insertion purposes, to be bent in the transverse direction B toward the blocking body 73, so that the locking element 71 can be introduced between fork arms 511, 512 of a universal joint 5 which are spaced apart from one another by a distance which corresponds to the width of the locking body 71 without the latching elements 76, as measured in the transverse direction B over the positioning elements 75.

Second latching elements 77 are formed, likewise as protrusions, externally on the positioning element 75 at a distance p from the first latching elements 76, as seen in the longitudinal direction L.

The handling means 72 comprises a gripping piece 78, which is fitted on the rear of the blocking body 73, or the main body 74 thereof, via a stem 79. The handling means 72 is preferably formed in one piece with the locking element 71, and therefore the securing device 7 as a whole can be produced in the form of a single-piece plastic injection molding.

In the preferred embodiment illustrated, the securing device 7 is designed to be mirror-symmetrical in relation to a mirror plane S which is defined in the longitudinal direction L and the height direction H.

In the preferred embodiment illustrated, the securing device 7 is likewise designed to be mirror-symmetrical in relation to a mirror plane which runs in the longitudinal direction L and the transverse direction B, parallel to the plane of the drawing in FIG. 3.

Figure 5:
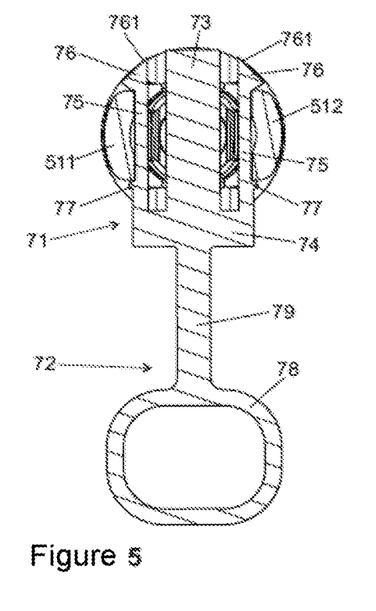
FIG. 5 is a cross-sectional view through the universal joint of FIG. 4 with the securing device inserted.
Figure 6:
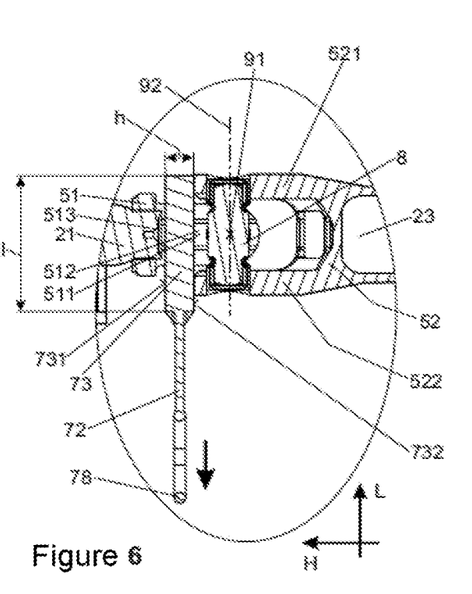
FIG. 6 is a longitudinal sectional view through the universal joint of FIG. 4 with the securing device inserted.

FIG. 4 shows an enlarged perspective view of the universal joint 5, FIG. 5 shows a cross section through the securing device 7 in the inserted state and FIG. 6 shows a longitudinal section.

The universal joint 5 has a first joint fork 51, which is fitted on the steering spindle 21 and has two opposite first fork arms 511 and 512, which extend from a first fork base 513. The first fork arms 511 and 512 have mutually aligned first bearings 514, in which first bearing pins 81 of a cardan spider 8 are mounted such that they can be rotated about a first joint axis 91.

The universal joint 5 has a second joint fork 52, which is fitted on the intermediate shaft 23 and has two opposite second fork arms 521 and 522, which extend from a second fork base 523. The second fork arms 521 and 522 have mutually aligned second bearings 524, in which second bearing pins 82 of a cardan spider 8 are mounted such that they can be rotated about a second joint axis 92.

The first joint axis 91 and the second joint axis 92 are perpendicular to one another and are located in the same plane of the cardan spider 8.

As can be gathered from FIGS. 5 and 6, the locking element 71 of the securing device 7 is inserted into the first joint fork 51, between the fork arms 511 and 512, and therefore the latter lie against the positioning elements 75 from the outside. It can be gathered from FIG. 5 that the width of the fork arms 511 and 512 corresponds to the distance p between the latching elements 76 and 77. As a result, the locking element 71 is fixed on the fork arms 511 and 512 in the longitudinal direction L. Since the positioning elements 75 are fitted resiliently relative to the blocking body 73, they ensure that the blocking body 73 is centered automatically between the fork arms 511 and 512 by the spring force in the transverse direction B.

FIG. 6 shows that the blocking body 73 lies against the first fork base 513, or is supported against the same, by way of its first supporting surface 731. By way of the second supporting surface 732, the blocking body 73 lies with a small amount of play against the joint-side ends of the second fork arms 521 and 522. It can be seen from this illustration that the length I of the blocking body 73 corresponds at least to the externally measured distance between the second fork arms 521 and 522. This means that the blocking body 73, in the inserted state, is always located between the second fork arms 521 and 522 and the first fork base 513.

If an attempt is made, when the securing device 7 is in the inserted state, to rotate, i.e. to pivot, the intermediate shaft 23 in relation to the steering spindle 21 about the first joint axis 91, at least one of the second fork arms 521 or 522 strikes against the supporting surface 732 of the blocking body 73, which in contrast is supported on the first fork base 513. The pivoting about the first joint axis 91 is blocked in this way. In contrast, pivoting about the second joint axis 92 is still possible, because the rounded configuration of the fork arms 521 and 522 means that the blocking body 73 is not subjected here to any force.

By virtue of the blocking body 73 being centered by the positioning elements 75, which according to the invention are fitted resiliently on opposite sides, the blocking body 73 is reliably positioned between the first fork arms 511 and 512, parallel to the second joint axis 92, and therefore the second fork arms 521 and 522 are reliably supported and the desired limitation of movement is thus ensured.

As indicated in FIG. 6 by the arrow, the securing device 7 can easily be pulled out of the universal joint 5 using the gripping piece 78 of the handling means 72. This is possible because the positioning elements 75 can be bent elastically toward the blocking body 73 such that the latching elements 76 can slide through between the fork arms 511 and 512. The insertion of the securing device 7 is facilitated by the introduction slopes 761, which prevent damage to the positioning elements 75 and ensure an automatic latching-in action.

Figure 7:
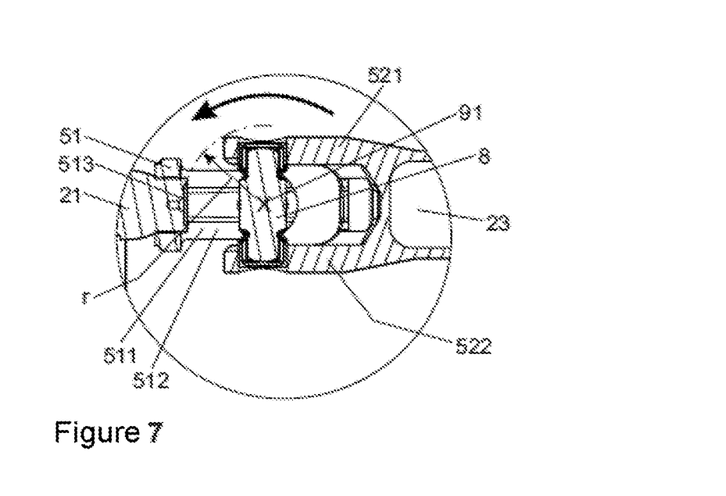
FIG. 7 is a longitudinal sectional view through a universal joint as in FIG. 5, but without the securing device.

When the securing device 7 has been removed, full pivoting capability about the first joint axis 91 is enabled again, as is illustrated in FIG. 7 by the curved arrow. It can likewise clearly be gathered from this illustration how, as pivoting takes place about the first joint axis, the second fork arms 521 and 522 are moved through a spatial region of radius r, said spatial region being indicated by dashes. In the case of the method according to the invention, said spatial region is filled, or occupied, by the blocking body 73, and therefore the movement capability about the first joint axis 91 is limited in a defined manner.

Figure 8:
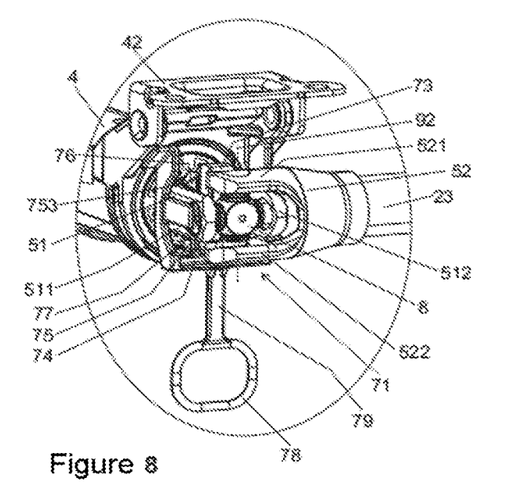
FIG. 8 is a detail view of an example universal joint with another example securing device.
Figure 9:
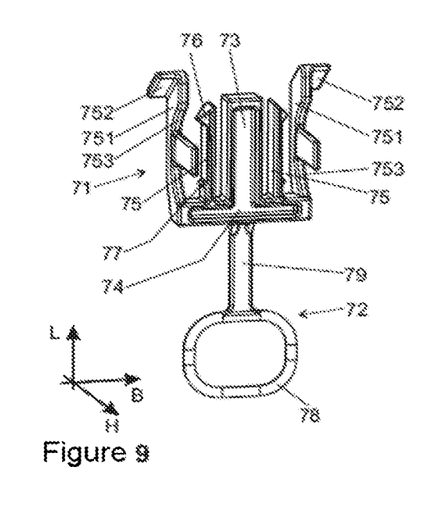
FIG. 9 is a perspective view of the example securing device of FIG. 8.
Figure 10:
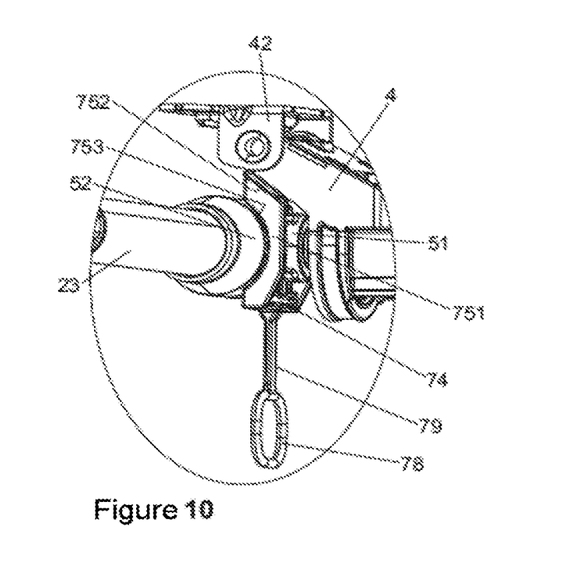
FIG. 10 is a detail view of the universal joint with the example securing device of FIG. 8.

FIGS. 8 to 10 illustrate a second embodiment of the securing device 7 according to the invention. The locking element 71 of the securing device 7 is inserted into the first joint fork 51, between the fork arms 511 and 512, and therefore the latter rest against the positioning elements 75 from the outside. Since the positioning elements 75 are fitted resiliently relative to the blocking body 73, they ensure that the blocking body 73 is centered automatically between the fork arms 511 and 512 by the spring force in the transverse direction B.

Starting from the main body 74, two supporting elements 751 extend in the longitudinal direction L, parallel to the positioning elements 75. In FIG. 8, the securing device 7 has been inserted into the joint fork 51 of the steering column, wherein the fork arm 511 is accommodated between the one supporting element 751 and the positioning element 75 and the fork arm 512 is accommodated between the other supporting element 751 and the other positioning element 75. At their free ends, the supporting elements 751 have a contact portion 752, which is in operative connection with a vehicle-body-mounted steering-column component. For example, the contact portion 752 is in contact with the carrying unit 4 of the steering column 1 and, upon rotation of the steering spindle 21, is supported on the carrying unit 4 and thus prevents the steering spindle 21 from rotating about its axis of rotation (longitudinal axis) 202. It is thus possible for the securing device 7 according to the invention not just to limit the freedom of movement of the universal joint 5, but, at the same time, also to prevent the steering spindle 21, or the steering shaft 2, from rotating. There is therefore no need for a separate rotation-preventing means.

Furthermore, the supporting elements 751 each have an abutment portion 753, wherein said abutment portion 753 is designed such that pivoting of the joint fork 52 about the second joint axis 92 is restricted to a certain angle range. As can be seen in FIGS. 8 and 10, pivoting is restricted to ±90° about the second joint axis 92, wherein the joint fork 52 strikes against the one abutment portion 753 of the supporting element 751, and continued pivoting is therefore prevented. The abutment portion 753 is designed in the form of an arcuate depression in the peripheral region of the supporting element 751, said depression therefore corresponding with the outer stopping geometry of the joint fork 52.

List of reference signs

| | | | |
|---|---|---|---|
| 1 | Steering column | 513 | Fork base |
| 2 | Steering shaft | 52 | Joint fork |
| 21 | Steering spindle | 521, 522 | Fork arms |
| 22 | Fastening portion | 523 | Fork base |
| 23 | Intermediate shaft | 524 | Bearing 524 |
| 24 | Outer shaft | 6 | Universal joint |
| 25 | Inner shaft | 7 | Securing device |
| 26 | Coupling piece | 71 | Locking element |
| 202 | Axis of rotation | 72 | Handling means |
| 3 | Lateral-surface unit | 73 | Blocking body |
| 4 | Carrying unit | 731, 732 | Supporting surfaces |
| 41, 42 | Fastening means | 733, 734 | Side surfaces |
| 5 | Universal joint | 74 | Main body |
| 51 | Joint fork | 75 | Positioning elements |
| 511, 512 | Fork arms | 751 | Supporting elements |
| 514 | Bearing | 752 | Contact portion |
| 753 | Abutment portion | r | Radius |
| 76, 77 | Latching elements | | |
| 761 | Introduction slopes | | |
| 78 | Gripping piece | | |
| 79 | Stem | | |
| 8 | Cardan spider | | |
| 81 | Bearing pin | | |
| 91 | First joint axis | | |

-continued

| List of reference signs | | |
|---|---|---|
| 92 | Second joint axis | |
| L | Longitudinal direction | |
| B | Transverse direction | |
| H | Height direction | |
| A | Distance | |
| S | Mirror plane | |
| l | Length | |
| b | Width | |
| h | Thickness | |

What is claimed is:

1. A securing device temporarily limiting a freedom of movement of a universal joint for a shaft arrangement of a steering column, the universal joint comprising first and second forks rotatably coupled by a cardan spider, the securing device comprising a main body, a locking element that extends from the main body in a longitudinal direction and has a free front end at a front of the locking element in the longitudinal direction, and a handling means that extends from the main body in the longitudinal direction at a rear of the locking element, wherein the locking element comprises:
a first positioning element;
a second positioning element; and
a blocking body configured as a singular structure that extends from the main body in the longitudinal direction and is centered between the first and second positioning elements,
wherein the first and second positioning elements are disposed on opposite sides of the blocking body and extend from the main body in the longitudinal direction adjacent to the blocking body,
wherein the first and second positioning elements are resilient relative to the blocking body in a transverse direction that is orthogonal to the longitudinal direction,
wherein the locking element is inserted between opposing arms of the first fork and between a base of the first fork and the cardan spider such that the blocking body contacts the cardan spider or opposing arms of the second fork and the first and second positioning elements resiliently engage the arms of the first fork to permit only one degree of freedom of movement of the universal joint when the blocking body and the first and second positioning elements are disposed in the universal joint.

2. The securing device of claim 1 wherein the first and second positioning elements extend in the longitudinal direction but are spaced apart from the blocking body in the transverse direction, wherein a height direction is orthogonal to both the longitudinal direction and the transverse direction, wherein the blocking body and the first positioning element are equally thick as measured in the height direction.

3. The securing device of claim 1 wherein the blocking body extends longitudinally at least as far as the first and second positioning elements from the main body.

4. The securing device of claim 1 wherein the locking element is mirror-symmetrical relative to a mirror plane that intersects the blocking body and extends in the longitudinal and transverse directions.

5. A securing device temporarily limiting a freedom of movement of a universal joint for a shaft arrangement of a steering column, the universal joint comprising first and second forks rotatably coupled by a cardan spider, the securing device comprising a main body, a locking element that extends from the main body in a longitudinal direction and has a free front end at a front of the locking element in the longitudinal direction, and a handling means that extends from the main body in the longitudinal direction at a rear of the locking element, wherein the locking element comprises:
a first positioning element;
a second positioning element;
a blocking body that extends from the main body in the longitudinal direction; and
a first latching element and a second latching element disposed on the first positioning element, wherein the first and second latching elements are disposed at longitudinally-spaced locations along the first positioning element,
wherein the first and second positioning elements are disposed on opposite sides of the blocking body and extend from the main body in the longitudinal direction adjacent to the blocking body,
wherein the first and second positioning elements are resilient relative to the blocking body in a transverse direction that is transverse to the longitudinal direction,
wherein the locking element is inserted between opposing arms of the first fork and between a base of the first fork and the cardan spider such that the blocking body contacts the cardan spider or opposing arms of the second fork and the first and second positioning elements resiliently engage the arms of the first fork to permit only one degree of freedom of movement of the universal joint when the blocking body and the first and second positioning elements are disposed in the universal joint.

6. The securing device of claim 5 wherein the blocking body extends longitudinally at least as far as the first and second positioning elements from the main body.

7. The securing device of claim 5 wherein the first and second latching elements are spaced apart in the longitudinal direction and are disposed on a side of the first positioning element that faces away from the blocking body.

8. The securing device of claim 5 wherein the first latching element is disposed at a distal end of the first positioning element, wherein a first surface of the first latching element that faces away from the main body is beveled, wherein the first latching element includes a second surface that is beveled, wherein the beveled first surface is configured to facilitate insertion of the securing device, wherein the beveled second surface is configured to facilitate removal of the securing device.

9. The securing device of claim 5 wherein the first latching element is a triangular pyramid or a square pyramid.

10. A securing device temporarily limiting a freedom of movement of a universal joint for a shaft arrangement of a steering column, the universal joint comprising first and second forks rotatably coupled by a cardan spider, the securing device comprising a main body, a locking element that extends from the main body in a longitudinal direction and has a free front end at a front of the locking element in the longitudinal direction, and a handling means that extends from the main body in the longitudinal direction at a rear of the locking element as seen in the longitudinal direction, wherein the locking element comprises:
a first positioning element;
a second positioning element;
a blocking body that extends from the main body in the longitudinal direction and has a greater extent in a direction that is perpendicular to the longitudinal direction than the first positioning element or the second positioning element; and wherein the first and second positioning elements are disposed on opposite sides of the blocking body and extend from the main body in the longitudinal direction adjacent to the blocking body, wherein the first and second positioning elements are resilient relative to the blocking body in a transverse direction that is transverse to the longitudinal direction, wherein the locking element is inserted between opposing arms of the first fork and between a base of the first fork and the cardan spider such that the blocking body contacts the cardan spider or opposing arms of the second fork and the first and second positioning elements resiliently engage the arms of the first fork to permit only one degree of freedom of movement of the universal joint when the blocking body and the first and second positioning elements are disposed in the universal joint.

11. The securing device of claim 10 wherein the locking element is mirror-symmetrical relative to a mirror plane that intersects the blocking body and extends in the longitudinal and transverse directions.

12. The securing device of claim 10 wherein the blocking body is cuboidal with at least three planar faces that are all orthogonal to one another.

13. A securing device temporarily limiting a freedom of movement of a universal joint for a shaft arrangement of a steering column, the universal joint comprising first and second forks rotatably coupled by a cardan spider, the securing device comprising a main body, a locking element that extends from the main body in a longitudinal direction and has a free front end at a front of the locking element in the longitudinal direction, and a handling means that extends from the main body in the longitudinal direction at a rear of the locking element, wherein the locking element comprises:

a first positioning element;

a second positioning element; and a blocking body that extends from the main body in the longitudinal direction and having a volume that is greater than a volume of the first and second positioning elements combined, wherein the first and second positioning elements are disposed on opposite sides of the blocking body and extend from the main body in the longitudinal direction adjacent to the blocking body, wherein the first and second positioning elements are resilient relative to the blocking body in a transverse direction that is transverse to the longitudinal direction, wherein the locking element is inserted between opposing arms of the first fork and between a base of the first fork and the cardan spider such that the blocking body contacts the cardan spider or opposing arms of the second fork and the first and second positioning elements resiliently engage the arms of the first fork to permit only one degree of freedom of movement of the universal joint when the blocking body and the first and second positioning elements are disposed in the universal joint.

14. The securing device of claim 13 wherein the blocking body is cuboidal with at least three planar faces that are all orthogonal to one another.

15. The securing device of claim 13 wherein the locking element is mirror-symmetrical relative to a mirror plane that intersects the blocking body and extends in the longitudinal and transverse directions.

16. A steering column, comprising:

a carrying unit configured to attach to a vehicle;

a shaft arrangement rotatably disposed in the carrying unit, the shaft arrangement comprising a universal joint, the universal joint comprising first and second forks rotatably coupled by a cardan spider; and a securing device configured to temporarily limit movement of the universal joint to one degree of freedom, the securing device comprising a main body, a locking element that extends from the main body in a longitudinal direction and has a free front end at a front of the locking element in the longitudinal direction, and a handling means that extends from the main body in the longitudinal direction at a rear of the locking element, the locking element comprising:

a blocking body that extends from the main body in the longitudinal direction;

a first positioning element; and a second positioning element, wherein the first and second positioning elements are disposed on opposite sides of the blocking body and extend from the main body in the longitudinal direction adjacent to the blocking body, wherein the first and second positioning elements are resilient relative to the blocking body in a transverse direction that is transverse to the longitudinal direction, wherein the locking element is inserted between opposing arms of the first fork and between a base of the first fork and the cardan spider such that the blocking body degree of freedom of movement of the universal joint when the blocking body and the first and second positioning elements are disposed in the universal joint.

17. The steering column of claim 16 wherein the securing device is comprised of a softer material than the arms of the first fork.

18. The steering column of claim 16 wherein the securing device is configured to contact the arms of the second fork.

19. The steering column of claim 16 wherein the universal joint has a free distance between the base of the first fork and either the cardan spider or the arms of the second fork, wherein the blocking body has a thickness that is smaller than or equal to the free distance, with thickness being measured in a height direction that is orthogonal to both the longitudinal direction and the transverse direction.

20. The securing device of claim 16 wherein the blocking body extends longitudinally at least as far as the first and second positioning elements from the main body.

* * * * *